3,475,155
α-HALOACETANILIDES AS STUNTING AGENTS
Seiichi Ishida and Yuji Kawamura, Saitama-ken,
Japan, assignors to Monsanto Company, St. Louis,
Mo., a corporation of Delaware
No Drawing. Filed Apr. 12, 1965, Ser. No. 447,569
Claims priority, application Japan, Apr. 13, 1964,
39/20,590
Int. Cl. A01n 9/20
U.S. Cl. 71—76                                    4 Claims

ABSTRACT OF THE DISCLOSURE

Methods for regulating plant growth and particularly the height of grasses by applying thereto a composition containing an α-halo-o-acetotoluidide.

This invention relates to growth regulants and particularly to compositions for controlling the height of grasses. The novel growth regulants of this invention have as an active ingredient at least one α-halo-o-acetotoluidide represented by the general formula

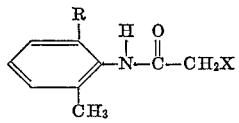

wherein R is a lower alkyl group having from one to four carbon atoms and X is chlorine, bromine or iodine. The compounds employed in accordance with the present invention can be readily prepared by the haloacetylation of the corresponding orthosubstituted aromatic amines.

Illustrative of the lower alkyl groups represented by R in the above formula are methyl, ethyl, propyl, butyl, isopropyl, tertiary butyl and the like.

The use of the chemical of the present invention makes it possible to inhibit and control for a long period the growth in height of grasses such as pasturages, weeds, and lawns, without killing the plants. In contrast to previously known plant growth regulants, the compositions of the present invention do not have any adverse effect upon the treated plants. Thus, the compositions of the present invention permit the control of plant height without, for example, inhibiting seed germination, or injuring the plants being treated.

It has been found in accordance with the present invention that α-halo-o-acetotoluidides of the above general formula reliably and predictably inhibit the vertical growth of grasses, while not causing any deleterious effect.

The use of the present compositions makes it possible to arrest the vertical growth of grasses at any time during the growth thereof, as well as to inhibit for over an extended period of time the height of the grasses without inhibiting the activity of the roots thereof nor the formation of lateral buds or offshoots, and, therefore, without killing the plants nor the regenerating ability thereof.

It is well known that maleic hydrazide (1,2-dihydropyridazine) has been used as a growth regulant. However, maleic hydrazide is fundamentally different in action and effect from the compounds of the present invention. That is, the inhibiting action of maleic hydrazide is such that the application thereof to a plant body seriously injures every growth point of the plant or destroys the plant. Therefore, after the application of maleic hydrazide, normal organs are difficultly formed again and the growth point of lateral buds or offshoots is also attacked, with the result that the growth of the plant in height is inhibited. In the case of the present compositions, however, the function of a plant in growth points which have been present at the time of application is brought temporarily into a suspended state and the function of each growth point of the plant is not injured but is restored later to permit normal development of the organs.

Upon application of the present compounds, plants bend at the base portion of the plant body, and the leaves also bend toward the ground, whereby the apparent height of the plant becomes lower than at the time of application and offshoots or lateral buds are increased in number. Thus, the present compounds are fundamentally different from MH in effect on plants, give entirely novel effects which are different in mechanism of action from those of known growth controlling agents, and are far superior in effect.

Representative α-halo-o-acetotoluidides encompassed by the present invention include 6-tert-butyl-α-chloro-o-acetotoluidide,
6-isopropyl-α-chloro-o-acetotoluidide,
6-ethyl-α-chloro-o-acetotoluidide,
6-methyl-α-chloro-o-acetotoluidide,
6-n-propyl-α-chloro-o-acetotoluidide,
6-tert.-butyl-α-iodo-o-acetotoluidide,
6-methyl-α-iodo-o-acetotoluidide,
6-isopropyl-α-bromo-o-acetotoluidide,
6-tert.-butyl-α-bromo-o-actotoluidide, and
6-n-butyl-α-bromo-o-acetotoluidide.

One or more of these compounds may be used per se. Alternately, they can be employed in the form of a liquid, dust or granular formulation by mixing them with a solid carrier such as kaolin, clay, talc, diatomaceous earth, silica, vermiculite, or saw dust; with a liquid carrier such as xylene, benzene or cyclohexanone; or with a gaseous carrier such as air or dichlorodifluoromethane, and, if necessary, in combination with adjuvants commonly used for general agricultural chemicals, such as vehicle, emulsifier and wetting agent.

The present compounds may also be used in admixture with a herbicide employed for the eradication of unwanted plants or terrestrial portions of plants, an insecticide such as an organic phosphorus or organic chlorine preparation, a fungicide such as an organic mercury, organic sulfur or copper formulation, an antibiotic, or with a single or complex fertilizer.

In practice, the present chemicals may be sprayed onto the stems or leaves of grasses to be treated which may either be natural occurrence or under cultivation, or the chemicals may be incorporated into the soil in which the grasses are grown, at the time when the grasses have reached a certain height, or after cutting the grasses to an optional height.

The rate of application of the present growth regulants can vary considerably. In most instances, it is maintained between about 5 grams and about 150 grams per 1000 square meters. Optimum results are generally obtained when the growth regulants are applied at between about 25 grams and about 100 grams per 1000 square meters.

The following examples illustrate the advantageous effects of the present compounds:

EXAMPLE 1

Test for controlling the height of perennial pasturage by spraying chemicals to the stems and leaves thereof Into each of a series of unglazed pots about 15 cm. in diameter, about 200 grains of perennial rye grass seeds were sowed, cultured and grown. When the grass had grown to about 4, 7 and 10 cm. in height, respectively, each chemical to be tested was diluted with water to a proportion of 100 l. per 1000 square meters and sprayed by means of a small sprayer to the stems and leaves of the grass in each pot. After the application, the height of each grass was investigated every week during 1–8 weeks.

The results are shown in Table 1, wherein the amount of chemical is expressed in grams per 1000 square meters.

ling effects, like in Example 1. Moreover, the fact that, when all the terrestrial portions of the grass had been

TABLE 1

| Height of grass when treated | Test chemical | Amount of chemical | Height of grass (cm.) | | | | | | | |
|---|---|---|---|---|---|---|---|---|---|---|
| | | | After 1 week | After 2 weeks | After 3 weeks | After 4 weeks | After 5 weeks | After 6 weeks | After 7 weeks | After 8 weeks |
| 4 cm | 6-t-butyl-α-chloro-o-acetotoluidide | 25 | 4 | 4 | 4 | 4 | 4 | 7 | 10 | 13 |
| | do | 50 | 4 | 4 | 4 | 4 | 4 | 5 | 7 | 9 |
| | do | 100 | 4 | 4 | 4 | 4 | | | | |
| | Maleic anhydride (Comparison) | 50 | 6 | 7 | 9 | 10 | 13 | 15 | 16 | 17 |
| | do | 100 | 6 | 7 | 9 | 11 | 13 | 16 | 16 | 16 |
| | Untreated | | 7 | 8 | 9 | 11 | 14 | 16 | 17 | 17 |
| 7 cm | 6-t-butyl-α-chloro-o-acetotoluidide | 25 | 7 | 7 | 6 | 9 | 13 | 16 | 17 | 17 |
| | do | 50 | 7 | 7 | 6 | 7 | 12 | 14 | 15 | 17 |
| | do | 100 | 7 | 7 | 6 | 5 | 7 | 8 | 9 | 12 |
| | Maleic hydrazide (Comparison) | 50 | 8 | 9 | 11 | 13 | 15 | 16 | 17 | 77 |
| | do | 100 | 8 | 9 | 11 | 13 | 14 | 15 | 17 | 17 |
| | Untreated | | 8 | 9 | 11 | 14 | 16 | 17 | 17 | 17 |
| 10 cm | 6-t-butyl-α-chloro-o-acetotoluidide | 25 | 10 | 10 | 10 | 13 | 15 | 17 | 18 | 18 |
| | do | 50 | 10 | 10 | 9 | 8 | 13 | 15 | 16 | 17 |
| | do | 100 | 10 | 10 | 9 | 8 | 8 | 10 | 12 | 14 |
| | Maleic hydrazide (Comparison) | 50 | 12 | 14 | 15 | 16 | 18 | 18 | 18 | 18 |
| | do | 100 | 11 | 13 | 15 | 17 | 17 | 17 | 18 | 18 |
| | Untreated | | 12 | 15 | 16 | 17 | 18 | 18 | 18 | 18 |

As is clear from the above table, when the compounds of the present invention were applied to the grass of 4 cm. in height so that the amounts of the active ingredient were between 25 g. and 50 g. per 1000 square meters, the height of the grass was controlled as long as 5 and 6 weeks, respectively, but thereafter the grass initiated to grow again.

In contrast, maleic anhydride, at the same concentration as above, gave no controlling effect to the grass of 4 cm. in height, and little effect was observed when applied to the grass of 7 cm. and 10 cm. in height.

EXAMPLE 2

Test for controlling the height of perennial pasturage by the treatment of soil

In the same manner as in Example 1, perennial grasses were cultivated and grown. When the apparent height of the grasses had reached about 12 cm., the terrestrial portions of the grasses were cut to the height of 0 and 5 cm. Each test chemical was diluted with water so that the amount to be applied became 50–200 l. per 1000 square meters. The dilute chemical was added dropwise to the soil in each pot so as to be thoroughly applied onto the whole surface of the soil. The height of each grass was investigated in the same manners as in Example 1.

The results are shown in Table 2.

cut off, the height of grass after the growth was controlled to 3 cm. for a long period of time, substantiates the fact that the chemical is absorbed not only through the stems and leaves but also through the roots to control only the height of grass, without giving any detrimental effect to the activity of the grass.

EXAMPLE 3

Change in height and in number of stems of aquatic rice by spraying chemicals to the stems and leaves Into each of three 1/50000 a. Wagner pots, aquatic rice plants at 6–7 leaf-stage were transferred. When the height of the plants had reached about 40 cm., each test chemical diluted with water at a proportion of 100 l. per 1000 square meters was sprayed with a small sprayer. After the application, the height and the number of stems of the plants were investigated every week for 1 to 10 weeks until the plants came into ears.

The results are set forth in Table 3, wherein Runs A, B and C involve use of 6-t-butyl-α-chloro-o-acetotoluidide at rates of 25, 50 and 100 grams per 1000 square meters, respectively. Run D designates untreated plants.

TABLE 3

| Run | | At the time of application | After 1 week | After 2 weeks | After 3 weeks | After 4 weeks | After 5 weeks | After 6 weeks | After 7 weeks | After 8 weeks | After 9 weeks | After 10 weeks |
|---|---|---|---|---|---|---|---|---|---|---|---|---|
| A | Height (cm.) | 39 | 42 | 45 | 45 | 46 | 47 | 51 | 56 | 62 | 65 | 67 |
| | Number of stems | 2.0 | 3.7 | 4.5 | 6.0 | 6.3 | 6.7 | 7.4 | 7.8 | 7.6 | 7.6 | 7.4 |
| B | Height (cm.) | 38 | 43 | 44 | 44 | 44 | 45 | 46 | 47 | 49 | 54 | 60 |
| | Number of stems | 2.0 | 3.3 | 4.8 | 6.3 | 7.5 | 8.2 | 8.2 | 8.0 | 7.6 | 7.7 | 7.5 |
| C | Height (cm.) | 37 | 38 | 38 | 38 | 38 | 38 | 38 | 40 | 43 | 45 | 48 |
| | Number of stems | 1.4 | 2.8 | 3.0 | 3.4 | 4.7 | 5.5 | 6.6 | 8.1 | 7.7 | 6.5 | 4.8 |
| D | Height (cm.) | 38 | 47 | 55 | 61 | 65 | 68 | 71 | 72 | 72 | 73 | 78 |
| | Number of stems | 2.0 | 3.8 | 4.3 | 5.2 | 6.1 | 6.7 | 7.3 | 7.8 | 7.6 | 7.5 | 7.5 |

As shown in the above table, the aquatic rice plant treated with the present chemical in each amount is obviously inhibited in height for 4, 6 and 9 weeks, but is scarcely affected or rather accelerated in the number of

TABLE 2

| Height of grass when treated | Test chemical | Amount of chemical | Height of grass (cm.) | | | | | | | |
|---|---|---|---|---|---|---|---|---|---|---|
| | | | After 1 week | After 2 weeks | After 3 weeks | After 4 weeks | After 5 weeks | After 6 weeks | After 7 weeks | After 8 weeks |
| 0 cm. (all the terrestrial portions cut). | 6-t-butyl-α-chloro-o-acetotoluidide | 25 | 3 | 3 | 3 | 3 | 6 | 10 | 13 | 15 |
| | do | 50 | 3 | 3 | 3 | 3 | 4 | 5 | 8 | 12 |
| | do | 100 | 3 | 3 | 3 | 3 | 3 | 5 | 7 | 9 |
| | Maleic hydrazide (Comparison) | 50 | 3 | 5 | 8 | 12 | 14 | 16 | 16 | 16 |
| | do | 100 | 3 | 4 | 7 | 12 | 14 | 16 | 16 | 16 |
| | Untreated | | 3 | 5 | 8 | 14 | 16 | 16 | 16 | 16 |
| 5 cm. (cut to height of 5 cm.). | 6-t-butyl-α-chloro-o-acetotoluidide | 25 | 7 | 7 | 7 | 9 | 10 | 12 | 14 | 16 |
| | do | 50 | 7 | 7 | 7 | 7 | 10 | 11 | 14 | 17 |
| | do | 100 | 7 | 7 | 7 | 7 | 7 | 9 | 10 | 13 |
| | Maleic hydrazide (Comparison) | 50 | 7 | 8 | 10 | 13 | 15 | 16 | 16 | 16 |
| | do | 100 | 7 | 9 | 10 | 14 | 14 | 16 | 16 | 16 |
| | Untreated | | 7 | 10 | 11 | 14 | 16 | 16 | 16 | 16 |

As is clear from the above table, the present compounds, when applied to soil, also show marked controllstems. This substantiates the fact that the present chemical greatly inhibits the growth of grass in height but does not suppress the formation of lateral buds or offshoots, i.e., gives no detrimental effect to the activity of plant.

The following examples are typical growth regulant compositions in accordance with the present invention. In these formulations all proportions are expressed in parts by weight.

EXAMPLE 4

| | Parts |
|---|---|
| 6-t-butyl-α-chloro-o-acetotoludide | 75 |
| Clay | 15 |
| Diatomaceous earth | 5 |
| "Runox 1000 C" (a surface active agent produced by Toho Kagaku K.K.) | 5 |

The above components are homogeneously mixed and ground to form a hydrated formulation.

EXAMPLE 5

| | Parts |
|---|---|
| 6-isopropyl-α-chloro-o-acetotoluidide | 25 |
| Xylene | 17 |
| Cyclohexanone | 52 |
| "Sorbol 800 A" (a product of Toho Kagaku K.K.) | 6 |

The above components are homogeneously mixed to form an emulsion.

EXAMPLE 6

| | Parts |
|---|---|
| 6-t-butyl-α-chloro-o-acetotoluidide | 2 |
| Clay | 98 |

The above components are homogeneously mixed to form a dust formulation.

EXAMPLE 7

| | Parts |
|---|---|
| 6-t-butyl-α-chloro-o-acetotoluidide | 2 |
| Bentonite | 60 |
| Clay | 38 |

The above components are homogeneously mixed. To the mixture, a suitable amount of water is added and the resultant mixture is granulated by means of a granulator according to conventional means to form a granular formulation.

Although the invention has been described in detail with respect to specific examples, it is not intended that the details thereof shall be limitations on the scope of the invention except as set forth in the appended claims.

What is claimed is:

1. A method of inhibiting the vertical growth of grasses which comprises applying thereto at a rate from about 5 grams to about 150 grams per 1000 square meters a compound of the formula

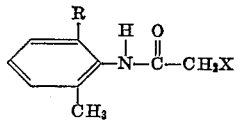

wherin R is alkyl having a maximum of 4 carbon atoms, and X is selected from the group consisting of chlorine, bromine and iodine.

2. A method in accordance with claim 1 wherein the compound is 6-t-butyl-α-chloro-o-acetotoluidide.

3. A method in accordance with claim 1 wherein the compound is 6-isopropyl-α-chloro-o-acetotoluidide.

4. A method in accordance with claim 1 wherein X is chlorine.

References Cited

UNITED STATES PATENTS

| 3,345,151 | 10/1967 | Olin | 71—76 |
| 2,863,752 | 12/1958 | Hamm et al. | 71—2.3 |

FOREIGN PATENTS

| 578,434 | 6/1959 | Canada. |
| 792,791 | 4/1958 | Great Britain. |
| 622,131 | 12/1962 | Belgium. |

LEWIS GOTTS, Primary Examiner

G. HOLLRAN, Assistant Examiner

U.S. Cl. X.R.

71—118